(12) United States Patent
Guo et al.

(10) Patent No.: US 9,007,944 B2
(45) Date of Patent: Apr. 14, 2015

(54) ONE-TO-MANY AND MANY-TO-ONE COMMUNICATIONS ON A NETWORK

(71) Applicant: Microsoft Corporation, Redmond, WA (US)

(72) Inventors: Chuanxiong Guo, Jiangsu (CN); Yongqiang Xiong, Beijing (CN); Yongguang Zhang, Beijing (CN); Guohan Lv, Seattle, WA (US); Jiaxin Cao, Changchun (CN)

(73) Assignee: Microsoft Corporation, Redmond, WA (US)

( * ) Notice: Subject to any disclaimer, the term of this patent is extended or adjusted under 35 U.S.C. 154(b) by 167 days.

(21) Appl. No.: 13/660,143

(22) Filed: Oct. 25, 2012

(65) Prior Publication Data
US 2014/0119204 A1     May 1, 2014

(51) Int. Cl.
| H04L 12/26 | (2006.01) |
| H04L 1/16 | (2006.01) |
| H04L 1/18 | (2006.01) |
| H04L 12/44 | (2006.01) |
| H04L 12/861 | (2013.01) |
| H04L 1/00 | (2006.01) |

(52) U.S. Cl.
CPC *H04L 12/44* (2013.01); *H04L 1/16* (2013.01); *H04L 1/1803* (2013.01); *H04L 1/1883* (2013.01); *H04L 43/16* (2013.01); *H04L 49/9078* (2013.01); *H04L 2001/0097* (2013.01)

(58) Field of Classification Search
CPC ...... H04L 12/44; H04L 45/48; H04L 2012/44
USPC .................................................. 379/256, 252
See application file for complete search history.

(56) References Cited

U.S. PATENT DOCUMENTS

| 5,291,324 | A | 3/1994 | Hinterlong | |
| 7,080,157 | B2 | 7/2006 | McCanne | |
| 7,092,999 | B2 | 8/2006 | Levitan | |
| 7,184,789 | B2 | 2/2007 | Leung et al. | |
| 8,364,723 | B1 * | 1/2013 | Hseush et al. | 707/803 |
| 8,699,486 | B1 * | 4/2014 | Luo et al. | 370/390 |
| 2005/0068954 | A1 * | 3/2005 | Liu et al. | 370/390 |
| 2006/0215588 | A1 * | 9/2006 | Yoon | 370/310 |
| 2007/0177527 | A1 * | 8/2007 | Bragg et al. | 370/256 |
| 2007/0217346 | A1 * | 9/2007 | Zheng et al. | 370/255 |
| 2007/0266370 | A1 | 11/2007 | Myers et al. | |
| 2008/0181118 | A1 * | 7/2008 | Sharma et al. | 370/238 |
| 2009/0052448 | A1 * | 2/2009 | Ramakrishnan et al. | 370/390 |
| 2009/0059923 | A1 * | 3/2009 | Guo et al. | 370/390 |
| 2010/0318831 | A1 * | 12/2010 | Scott et al. | 713/600 |

(Continued)

OTHER PUBLICATIONS

Alizadeh et al., "Data Center TCP (DCTCP)," In Proceedings of the ACM SIGCOMM Conference on Applications, Technologies, Architectures, and Protocols for Computer Communications, Aug. 30, 2010, 12 pages.

(Continued)

*Primary Examiner* — Gary Mui
(74) *Attorney, Agent, or Firm* — Dan Choi; Judy Yee; Micky Minhas (57) ABSTRACT

Some implementations include routing and/or delivering communications within a network system. In one example, a packet source may be configured to recursively encode a data delivery tree so that any sub-tree formed from the data delivery tree compresses a continuous data block of the data delivery tree.

20 Claims, 8 Drawing Sheets

(56) References Cited

U.S. PATENT DOCUMENTS

| | | |
|---|---|---|
| 2011/0249970 A1 | 10/2011 | Eddleston et al. |
| 2012/0059790 A1* | 3/2012 | Clemencon et al. ............ 706/55 |
| 2012/0215940 A1* | 8/2012 | O'Neal et al. ................ 709/252 |
| 2014/0003285 A1* | 1/2014 | Jain et al. ...................... 370/254 |
| 2014/0036913 A1* | 2/2014 | Olofsson et al. .............. 370/390 |

OTHER PUBLICATIONS

Anand et al., "Packet Caches on Routers: The Implications of Universal Redundant Traffic Elimination," in Proceedings of the ACM SIGCOMM Conference on Data Communication, Aug. 17, 2008, 12 pages.

"Avaya Ethernet Routing Switch 8600," Retrieved on: Jun. 18, 2012, 6 pages <<http://www.avaya.com/uk/resource/ assets/brochures/dn5007.pdf>>, 6 pages.

Barroso et al., "Web Search for a Planet: The Google Cluster Architecture," In Journal of IEEE Micro, vol. 23, Issue 2, Mar. 2003, 7 pages.

Bernstein et al., "Hyder—A Transactional Record Manager for Shared Flash," In Proceedings of the 5th Biennial Conference on Innovative Data System Research, Jan. 9, 2011 <<http://www.cidrdb.org/cidr2011/Papers/CIDR11_Paper2.pdf>>, 12 pages.

Calder et al., "Windows Azure Storage: A Highly Available Cloud Storage Service with Strong Consistency," In Proceedings of the Twenty-Third ACM Symposium on Operating Systems Principles, Oct. 23, 2011, 15 pages.

Cayley, "A Theorem on Trees," Quarterly Journal of Mathematics, 1889, pp. 376-378, 3 pages.

Chaiken et al., "SCOPE: Easy and Efficient Parallel Processing of Massive Data Sets," In Proceedings of the VLDB Endowment, vol. 1, Issue 2, Aug. 23, 2008, 12 pages.

Chowdhury et al., "Managing Data Transfers in Computer Clusters with Orchestra," In Proceedings of the ACM SIGCOMMM Conference on Applications, Technologies, Architectures, and Protocols for Computer Communications, Aug. 15, 2011, 12 pages.

Dean et al., "MapReduce: Simplified Data Processing on Large Clusters," In Proceedings of 6th Symposium on Operating Systems Design and Implementation, Dec. 6, 2004, 13 pages.

Dobrescu et al., "RouteBricks: Exploiting Parallelism to Scale Software Routers," In Proceedings of the ACM SIGOPS 22nd Symposium on Operating Systems Principles, Oct. 11, 2009, 17 pages.

Duffy, "Cisco's 'Jawbreaker' Seen as Response to Competitive Pressure," Published on: Mar. 10, 2011. Available at <<http://www.networkworld.com/news/2011/031011-cisco-jawbreaker.html>>, 10 pages.

Floyd et al., "A Reliable Multicast Framework for Light-weight Sessions and Application Level Framing," In Proceedings of IEEE Transactions on Networking, Dec. 1997, 19 pages.

"Force10 Networks", Retrieved on: Jun. 20, 2012, Available at <<http://www.force10networks.com/>>, 1 page.

Ghemawat et al., "The Google File System," In Proceedings of 19th ACM Symposium on Operating Systems Principles, Oct. 19, 2003, 15 pages.

Guo et al., "BCube: A High Performance, Server-centric Network Architecture for Modular Data Centers," In Proceedings of the ACM SIGCOMM Conference on Data Communication, Aug. 17, 2009, 12 pages.

Guo et al., "Datacast: A Scalable and Efficient Group Data Delivery Service for Data Centers," Published on: Jun. 2011, <<http://research.microsoft.com/pubs/150424/techreport.pdf>>, 17 pages.

Handley et al., "The Reliable Multicast Design Space for Bulk Data Transfer," Published on: Aug. 2000, Available at <<http://gamay.tools.ietf.org/pdf/rfc2887.pdf>>, 23 pages.

Jacobson et al., "Networking Named Content," In Proceedings of the 5th International Conference on Emerging Networking Experiments and Technologies, Dec. 1, 2009, 12 pages.

Jerger et al., "Virtual Circuit Tree Multicasting: A Case for On-Chip Hardware Multicast Support," In Proceedings of the 35th Annual International Symposium on Computer Architecture, Jun. 2008, pp. 229-240, 12 pages.

Kohler et al., "The Click Modular Router," In Journal of ACM Transactions on Computer Systems, vol. 18, Issue 3, Aug. 2000, 34 pages.

Lehman et al., "Active Reliable Multicast," In Proceedings of IEEE INFOCOM, vol. 2, Mar. 1998, 9 pages.

Lu et al., "ServerSwitch: A Programmable and High Performance Platform for Data Center Networks," In Proceedings of the 8th USENIX Conference on Networked Systems Design and Implementation, Mar. 30, 2011, 14 pages.

Nagle et al., "The Panasas ActiveScale Storage Cluster—Delivering Scalable High Bandwidth Storage," In Proceedings of the ACM/IEEE Conference on Supercomputing, Nov. 6, 2004, 10 pages.

Rizzo, "pgmcc: A TCP-friendly Single-rate Multicast Congestion Control Scheme," In Proceedings of the ACM SIGCOMM Conference on Applications, Technologies, Architectures, and Protocols for Computer Communication, Aug. 28, 2000, 12 pages.

Tennenhouse et al., "Towards an Active Network Architecture," in Proceedings of ACM SIGCOMM Computer Communication Review, Apr. 1996, 14 pages.

"Torrent", Retrieved on: Jun. 20, 2012, Available at <<http://www.utorrent.com/>>, 1 page.

Vasudevan et al., "Safe and Effective Fine-grained TCP Retransmissions for Datacenter Communication," In Proceedings of the ACM SIGCOMM Conference on Data Communication, Aug. 17, 2009, 12 pages.

Wu et al., "ICTCP: Incast Congestion Control for TCP in Data Center Networks," In Proceedings of the 6th International Conference on Emerging Networking Experiments and Technologies, Nov. 30, 2010, 12 pages.

Yum et al., "Multicast Source Routing in Packet-Switched Networks," In Proceedings of IEEE Transactions on Communication, vol. 42, No. 2/3/4, Feb. 2004, 4 pages.

* cited by examiner

ONE-TO-MANY AND MANY-TO-ONE COMMUNICATIONS ON A NETWORK

BACKGROUND

TCP/IP (Transmission Control Protocol/Internet Protocol) was developed to address the needs of asynchronized one-to-one communication patterns between systems connected over the Internet. The asynchronous one-to-one communication implemented through TCP is designed specifically to solve communication problems related to communications between geo-distributed and loosely coupled systems, typically associated with the Internet. However, in data centers, huge numbers of servers are located in the same geo-location and, typically, utilize one-to-many or many-to-one communication patterns to effect parallel processing.

In order to support the one-to-many and many-to-one communications, data centers utilize multiple one-to-one TCP connections. This approach, essentially, builds many unicast TCP based overlays for each of the one-to-many or many-to-one communications. However, it is often the case that the TCP connection setup requires more time than the actual delivery of the data and each of the overlays consumes precious network bandwidth, as a single packet may be transmitted many times along the same path.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations herein include a system for routing one-to-many and many-to-one communications through a network. In one instance, an intermediate device is connected to a computing device such that a temporary memory of the computing device may be used to temporarily store data packets and a processor of the computing device may be used to schedule processing of the data packets. For example, the system may include a network switch connected to a server via a PCI-e interface. In another instance, a data delivery tree configured by the source of the data packet is provided with the data packet and parsed by intermediate systems to determine the routing to multiple destinations.

BRIEF DESCRIPTION OF THE DRAWINGS

The Detailed Description is described with reference to the accompanying figures. In the figures, the left-most digit(s) of a reference number identifies the figure in which the reference number first appears. The same numbers are used throughout the drawings to reference like features and components.

DETAILED DESCRIPTION

The disclosed techniques include implementations of a system for routing packets over a network to improve one-to-many and many-to-one communications. In one example, an intermediate device is connected to a computing device such that the temporary memory of the computing device may be used to temporarily store data packets, and the processor of the computing device may be used to schedule processing of the data packets. In another example, a data delivery tree configured by the source of the data packet is provided with the data packet and parsed by one or more intermediate systems to determine the routing of the data packet to multiple destinations.

Figure 1:
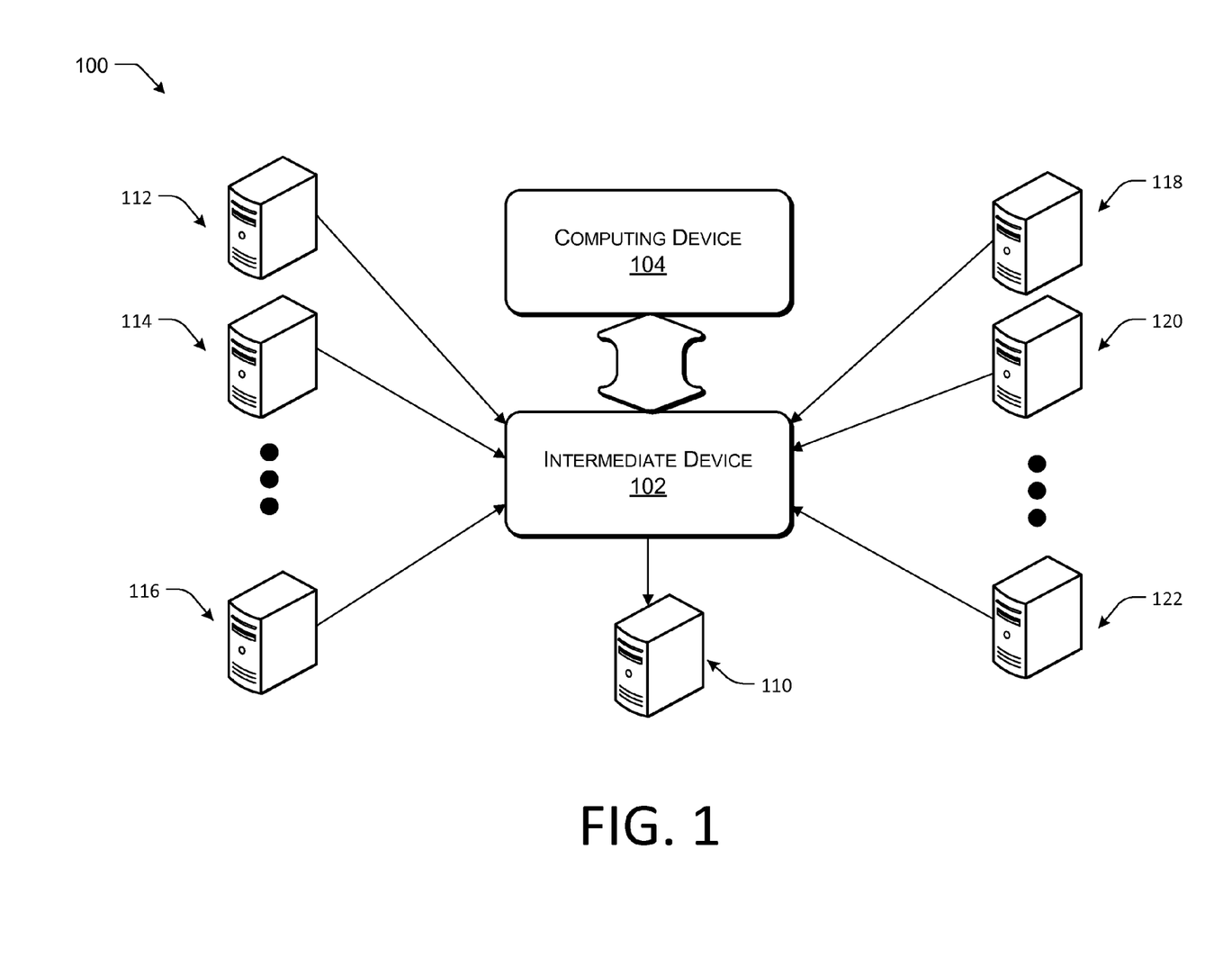
FIG. 1 is a pictorial view of an example of a network system according to some implementations.

FIG. 1 is a pictorial view of an example of a network system 100 according to some implementations. Network system 100 includes an intermediate device 102, a computing device 104, a packet destination 110, and packet sources 112, 114, 116, 118, 120, and 122 from which intermediate device 102 receives data packets to route to packet destination 110. Generally, each of packet sources 112-122 may transmit and receive data packets to and from packet destination 110 through intermediate device 102. Intermediate device 102 may communicate with packet destination 110 and/or packet sources 112-122 via a wireless networks, such as a wireless local-area-network (WLAN), a short-range wireless network, such as Bluetooth®, or a wired network system, such as an Ethernet protocol based system.

Intermediate device 102 may be any network computing device such as a switch, load balancer, router, modem, server system, or other known network device. In the present example, intermediate device 102 is illustrated as a network switch for receiving and routing data packets within a network system.

Computing device 104 may be any type of computing device, for example, computing device 104 may be one or more server systems. Computing device 104 includes an interface, such as a PCI-e interface, for communicating data to and from intermediate device 102.

Packet destination 110 and packet sources 104-112 may comprise any of the systems included in a network. In the present implementation, packet destination 110 and packet sources 104-112 are illustrated as server systems. Additionally, although six packet sources are shown, packet sources 112-122 may represent any number of systems, devices or components, from which intermediate device 102 can receive a data packet. Similarly, although one packet destination is shown, packet destination may be any number of intermediate devices configured to receive and process data packets. In some examples, a packet destination and a packet source may be interchangeable such that intermediate device 102 routes data packets to and from any of the packet destination 110 and/or packet sources 112-122.

In the illustrated example, a many-to-one communication scenario is presented. Intermediate device 102 receives data packets from packet sources 112-122, reads the data packets, and routes them to packet destination 110. In some instances, data packets are received at a rate greater than intermediate device 102 is able to process. In this instance, the data packets are queued within intermediate device 102. In typical implementations if the queue length exceeds the storage capacity of intermediate device 102, further incoming data packets are rejected or dropped. However, in the present implementation, intermediate device 102 is connected to computing device 104.

Computing device 104 is configured to monitor the queue length within intermediate device 102 and if the queue length exceeds a maximum threshold to request intermediate device 102 to forward incoming data packets to computing device 104. Computing device 104 stores the incoming data packets until computing device 104 detects that the queue length within intermediate device 102 has dropped below a minimum threshold. Once the queue length in intermediate device 102 is below the minimum threshold, computing device 104 begins to forward the stored data packets back to intermediate device 102 for routing to packet destination 110.

In this example, packet drops due to lack of buffer space within intermediate device 102 is avoided because data packets that would normally be dropped are forwarded to computing device 104 for queuing until buffer space becomes available. Thus, the typical timeout problem caused by TCP incast congestion is eliminated.

Figure 2:
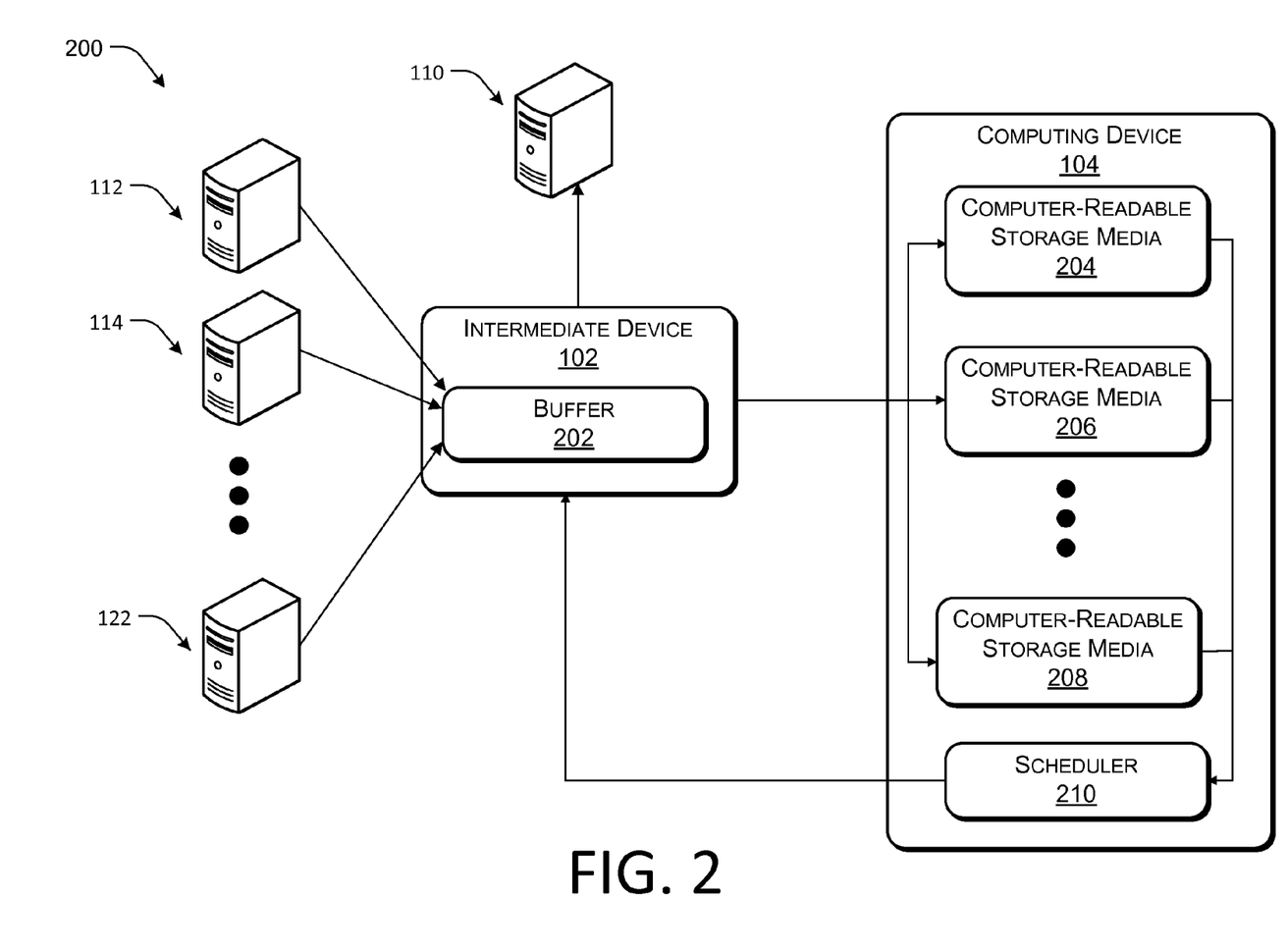
FIG. 2 is a block diagram of an example framework of a network system according to some implementations.

FIG. 1 provides one example implementation of network system 100 for resolving many-to-one communication issues. FIG. 2 provides a more detailed example implementation of a network system for resolving many-to-one communication problems.

FIG. 2 is a block diagram of an example framework of a network system 200 according to some implementations. Network system 200 includes intermediate device 102, computing device 104, packet destination 110, and packet sources 112-122 from which intermediate device 102 receives data packets to route to packet destination 110. Generally, packet sources 112-122 transmit and receive data packets to and from packet destination 110 through intermediate device 102 in a many-to-one network communication pattern.

Intermediate device 102 may be any network computing device such as a switch, load balancer, router, modem, server system, or other known network device. In the present example, intermediate device 102 is illustrated as a network switch for receiving and routing data packets within a network system. Intermediate device 102 includes buffer 202 for queuing data packets before the packets are routed to packet destination 110 by intermediate device 102.

Computing device 104 may be any type of computing device, for example, computing device 104 may be one or more server systems. Computing device 104 includes one or more interface, such as a PCI-e interface, for communicating data to and from intermediate device 102. Computing device 104 also includes one or more computer-readable storage media 204, 206, and 208 and scheduler 210.

One or more computer-readable storage media 204, 206, and 208 are configured to queue data packets. In one example, one or more computer-readable storage media 204, 206, and 208 are volatile memories such as dynamic random access memories (DRAMs). Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by the computing device.

In contrast, communication media may embody computer readable instructions, data structures, program modules, or other data in a modulated data signal, such as a carrier wave, or other transmission mechanism. As defined herein, computer storage media does not include communication media.

Scheduler 210 may be one or more processors, a multi core processor, a microcontroller, and/or other controller circuits. Scheduler 210 is configured to access computer-readable storage media 204, 206, and 208 to route and otherwise configure the data packets.

Packet destination 110 and packet sources 104-112 may comprise any of systems included in a network. In the present implementation, packet destination 110 and packet sources 104-112 are illustrated as server systems. Additionally, although six packet sources are shown, packet sources 112-122 may represent any number of systems from which intermediate device 102 can receive a data packet. Similarly, although one packet destination 110 is shown, packet destination 110 maybe any number of intermediate devices which can receive data packets from intermediate device 102. In some examples, a packet destination and a packet source may be interchangeable such that intermediate device 102 routes data packets to and from any of the packet destination 110 and/or packet sources 112-122.

Intermediate device 102 receives data packets from packet sources 112-122, reads the data packets, and routes them to packet destination 110. In some instances, data packets are received at a rate greater than intermediate device 102 is able to process. In this instance, the data packets are queued in buffer 202.

Computing device 104 is configured to monitor the queue length of buffer 202 and if the queue length exceeds a maximum threshold to request intermediate device 102 to forward incoming data packets to computing device 104. Computing device 104 stores the incoming data packets in computer-readable storage media 204, 206, and 208 until computing device 104 detects that the queue length of buffer 202 has dropped below a minimum threshold. Once the queue length is below the minimum threshold, computing device 104 begins to forward the stored data packets back to intermediate device 102 for routing to packet destination 110.

Scheduler 210 is configured to schedule the data packets queued in computer-readable storage media 204, 206, and 208 for processing by intermediate device 102. For example, scheduler 210 may assign the data packets to different queues based on the source and/or the destination of the data packets. In other examples, scheduler 210 may apply a fair queuing methodology such that every flow finishes roughly in the same amount of time and no flows are starved or timed out. Scheduler 210 may also be configured to reorder data packets to correct for out-of-order arrivals. In an example as scheduler 210 releases data packets back to intermediate device 102 for processing, scheduler 210 may release the data packets in an order different then in which the data packets were received.

Scheduler 210 may also be configured to detect so called long flows (i.e. flows that always have data arriving) and to prevent the long flows from being forwarded from intermediate device 102 to computing device 104, in order to prevent the long flows from looping through computer-readable storage media 204, 206, and 208 indefinitely.

Figure 3:
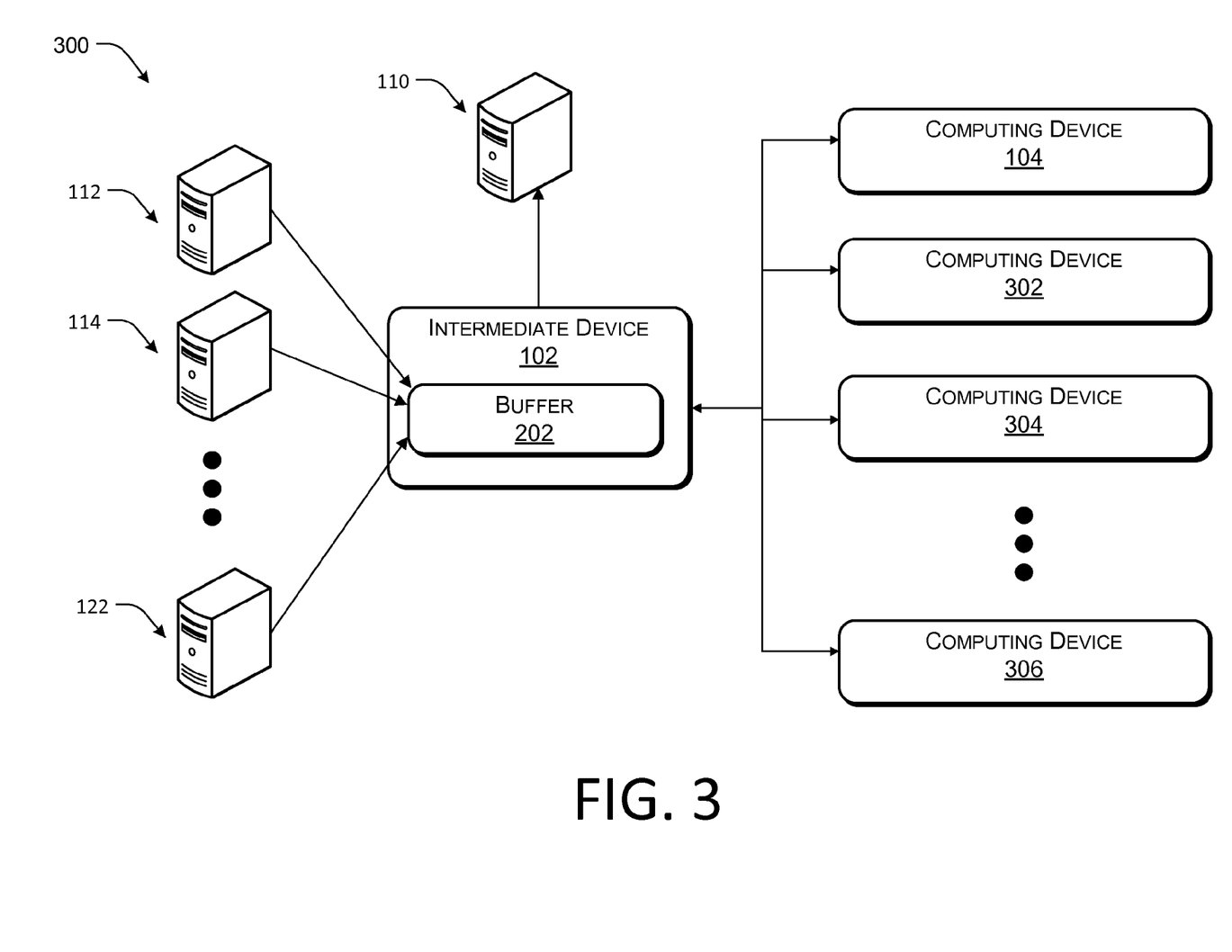
FIG. 3 is a block diagram of an example framework of a network system according to some implementations.

In this example, the processing power of the one or more processors of computing device 104 is utilized to improve overall flow of data packets to ensure fair queuing and even processing times. FIGS. 1-2 provide example implementations of network systems for resolving many-to-one communication issues. FIG. 3 provides yet another example implementation of a network system for resolving many-to-one communication problems.

FIG. 3 is a block diagram of an example framework of a network system 300 according to some implementations. Network system 300 includes intermediate device 102, computing devices 104, 302, 304, and 306, packet destination 110, and packet sources 112-122 from which intermediate device 102 receives data packets to route to packet destination 110. Generally, packet sources 112-122 transmit and receive data packets to and from packet destination 110 through intermediate device 102 in a many-to-one network communication pattern.

Intermediate device 102 may be any network computing device such as a switch, load balancer, router, modem, server system, or other known network device. In the present example, intermediate device 102 is illustrated as a network switch for receiving and routing data packets within a network system. Intermediate device 102 includes buffer 202 for queuing data packets before the packets are routed to packet destination 110 by intermediate device 102.

Computing devices 104, 302, 304, and 306 may be any type of computing device, for example, computing devices 104, 302, 304, and 306 may be one or more server systems. Each of computing devices 104, 302, 304, and 306 includes one or more interfaces for communicating data to and from intermediate device 102 and/or each other.

Packet destination 110 and packet sources 104-112 may comprise any of the systems included in a network. In the present implementation, packet destination 110 and packet sources 104-112 are illustrated as server systems.

Intermediate device 102 receives data packets from packet sources 112-122, reads the data packets, and routes them to packet destination 110. In some instances, data packets are received at a rate greater than intermediate device 102 is able to process. In this instance, the data packets are queued in buffer 202.

Computing devices 104, 302, 304, and 306 are configured to monitor the queue length of buffer 202 and if the queue length exceeds a maximum threshold to request intermediate device 102 to forward incoming data packets to at least one of computing devices 104, 302, 304, and 306. Intermediate device 102 forwards the incoming data packets evenly between computing devices 104, 302, 304, and 306. In an alternative example, intermediate device 102 provides incoming data packets to one of the computing devices 104, 302, 304, and 306 until the one of computing devices 104, 302, 304, and 306 indicates that intermediate device 102 should forward to another of computing devices 104, 302, 304, and 306.

In another example, intermediate device 102 forwards the incoming data packets to one of the computing devices 104, 302, 304, and 306, such as computing device 104, and computing device 104 schedules and/or routes the data packets to computing devices 302, 304, and 306. In this example, computing device 104 controls the data flow but is able to utilize the computer-readable storage media of computing devices 302, 304, and 306 to increase queue space.

Once the queue length in intermediate device 102 drops below a minimum threshold, computing devices 104, 302, 304, and 306 begins to forward the stored data packets back to intermediate device 102 for routing to packet destination 110. In one implementation, computing devices 104, 302, 304, and 306 provide the data packets back to intermediate device 102 in an even fashion. For example, one data packet from each of computing devices 104, 302, 304, and 306 may be provided in a round robin manner. In another implementation, computing device 104 directs data packets flow from computing devices 104, 302, 304, and 306 to intermediate device 102, such that the data packets received by intermediate device 102 are in an order indicated by computing device 104. In this implementation, computing device 104 is further able to control the flow of data between computing device 104, 302, 304, and 306 and intermediate device 102.

Figure 4:
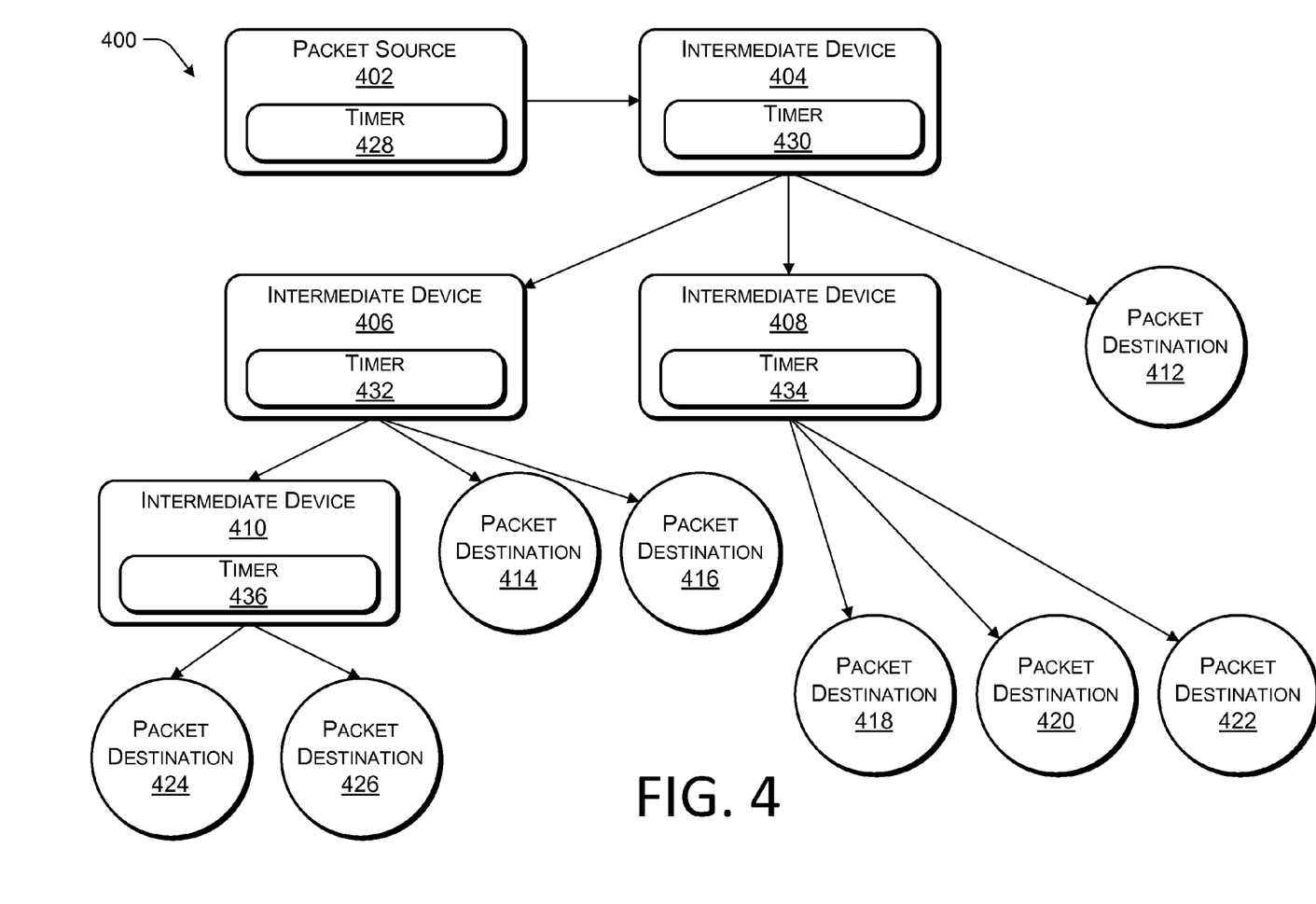
FIG. 4 is a block diagram of an example of a network system according to some implementations.

FIGS. 1-3 provide example implementations of network systems for resolving many-to-one communication issues. FIG. 4 provides an example implementation of a network system for resolving one-to-many communication problems.

FIG. 4 is a block diagram of an example of a network system 400 according to some implementations. Network system 400 includes packet source 402, intermediate devices 404, 406, 408, and 410, and packet destinations 412, 414, 416, 418, 420, 422, 424, and 426. Network system 400 illustrates the transmission of data packets from packet source 402 to packet destinations 412-426, as an example of a one-to-many communication situation.

Intermediate devices 404-410 are intermediate devices located along the routing path of the data packet. Intermediate devices 404-410 may be, for example, any network computing device such as a switch, load balancer, router, modem, server system, or other known network device.

Packet destinations 412-426 may comprise any of the systems included in a network, for example, one or more server systems. In some cases, one or more of intermediate devices 404-410 may also be a packet destination and receive the data packet for processing.

Packet source 402 and each of intermediate devices 404-410 include a timer. In the illustrated example, packet source 402 includes timer 428, intermediate device 404 includes timer 430, intermediate device 406 includes timer 432, intermediate device 408 includes timer 434, and intermediate device 410 includes timer 436. Each of timers 428-432 are utilized to determine if a data packet should be resent.

In the illustrated example, packet source 402 is providing data packet to packet destinations 412-414. The data packet is routed through various network systems, such as intermediate devices 404-410. Thus, network system 400 may be represented as a data tree corresponding to the path a data packet takes from packet source 402 to packet destinations 412-426. In the data tree representation packet source 402 is considered the root, intermediate device 404-410 the intermediate nodes, and packet destinations 412-426 the leaves.

The full structure of the tree is illustrated as follows. Packet source 402 is the parent of intermediate device 404. Intermediate device 404 is the parent of intermediate device 406, intermediate device 408, and packet destination 410. Intermediate device 406 is the parent of intermediate device 410 and packet destinations 414 and 416. Intermediate device 408 is the parent of packet destinations 418, 420, and 422. Intermediate device 410 is the patent of packet destinations 424 and 426.

In the example, packet source 402 sends the data packet to packet destinations 412-426, or a subset thereof. Packet source 402 first builds a data deliver tree and encodes the data tree as part of the data packet. The data tree is formed to be parseable by intermediate devices 406-410, such that the data tree may be split by intermediate devices 406-410 into sub-trees formed from continuous data blocks of the data tree. More details as to the form of the data tree will be discussed with respect to FIG. 5 below.

Once the data tree is encoded, packet source 402 provides the data tree with the data packet to intermediate device 404. Intermediate device 404 splits the data tree into to sub-trees. The first sub-tree includes a data tree with intermediate device 406 as the root and the second sub-tree includes a data tree with intermediate device 408 as the root. Intermediate device 404 also provides the data packet to packet destination 412.

Intermediate device 406 receives the first sub-tree from intermediate device 404. Intermediate device 406 splits the first sub-tree into a third sub-tree with intermediate device 410 as the root. Intermediate device 406 provides the third sub-tree to intermediate device 410 and the data packet to packet destinations 414 and 416.

Intermediate device 408 receives the second sub-tree and the data packet. Intermediate device 408 has no intermediate nodes as children. Therefore, intermediate device 408 forwards the data packet to packet destination 418, 420, and 422, but does not generate any additional sub-tree. Likewise, intermediate device 410 receives the third sub-tree and forwards the data packet to packet destination 424 and 426 without generating a sub-tree.

Each of packet destinations 412-426 (the leaf nodes) are configured to return an acknowledgment of receipt of the data packet. Each of the intermediate devices 404-410 (the intermediate nodes) are configured to aggregate all of the acknowledgments into an aggregated acknowledgement which intermediate devices 404-410, in turn, provide to their respective parent nodes (either another intermediate node or the source node). For example, intermediate device 406 receives acknowledgments from intermediate device 410 and packet destinations 414 and 416. The acknowledgement from intermediate device 410 includes acknowledgments from packet destinations 424 and 426. Intermediate device 406 aggregates the acknowledgments and provides the aggregated acknowledgment to intermediate device 404, which in turn aggregates the acknowledgments and provides them back to packet source 402. In this way packet source 402 is able to determine if each of the packet destinations 412-426 received the data packet.

However, in some instances data packets may become lost or dropped. Therefore, as each of intermediate devices 404-410 and packet source 402 provides the data packet to their respective child nodes, intermediate devices 404-410 and packet source 402 each start their respective timer 428-436. If the time expires before an acknowledgement is received from all child nodes, the data packet is resent. For example, once intermediate device 406 provides the third sub-tree to intermediate device 410 and the data packet to packet destination 414 and 416, intermediate device 406 starts timer 432. If timer 432 expires and intermediate device 406 has received acknowledgments from intermediate device 410 and packet destination 416 but not packet destination 414, intermediate device 406 resends the data packet to packet destination 414.

In one particular implementation, each intermediate device 404-410 generates an aggregated acknowledgement when respective timers 428-436 expires even if not all acknowledgments are received. For example if timer 432 started by intermediate device 406 expires and no acknowledgment from packet destination 414 is received, intermediate device 406 generates the aggregated acknowledgment and provides it to intermediate device 404. In this example, the aggregated acknowledgment includes an ID of the current node (intermediate device 406) and a list of the non responsive children (packet destination 414). Intermediate device 406 does not need to include the list of all responding children because the structure of data delivery tree is known to intermediate device 404 (the parent of intermediate device 406) and thus if intermediate device 406 had many children the data size of the aggregated acknowledgment remains small saving network bandwidth. This is particular useful as the number of non-responsive children is typically much smaller than the number of acknowledging children.

In another implementation, each of timers 428-436 corresponding to a different level of the data delivery tree may be of a different length. For example, timer 430 started by packet source 404 may be longer in duration than timer 432 started by intermediate device 406, such that intermediate device 406 has time to resend the data packet to a non-responsive child before intermediate device 404 resends the data packet to intermediate device 406. Thus, the data packet is resent at a localized level and network system bandwidth is not utilized as a result of resending the data packet through the entire data path, for example, from packet source 402 to packet destination 414.

Figure 5:
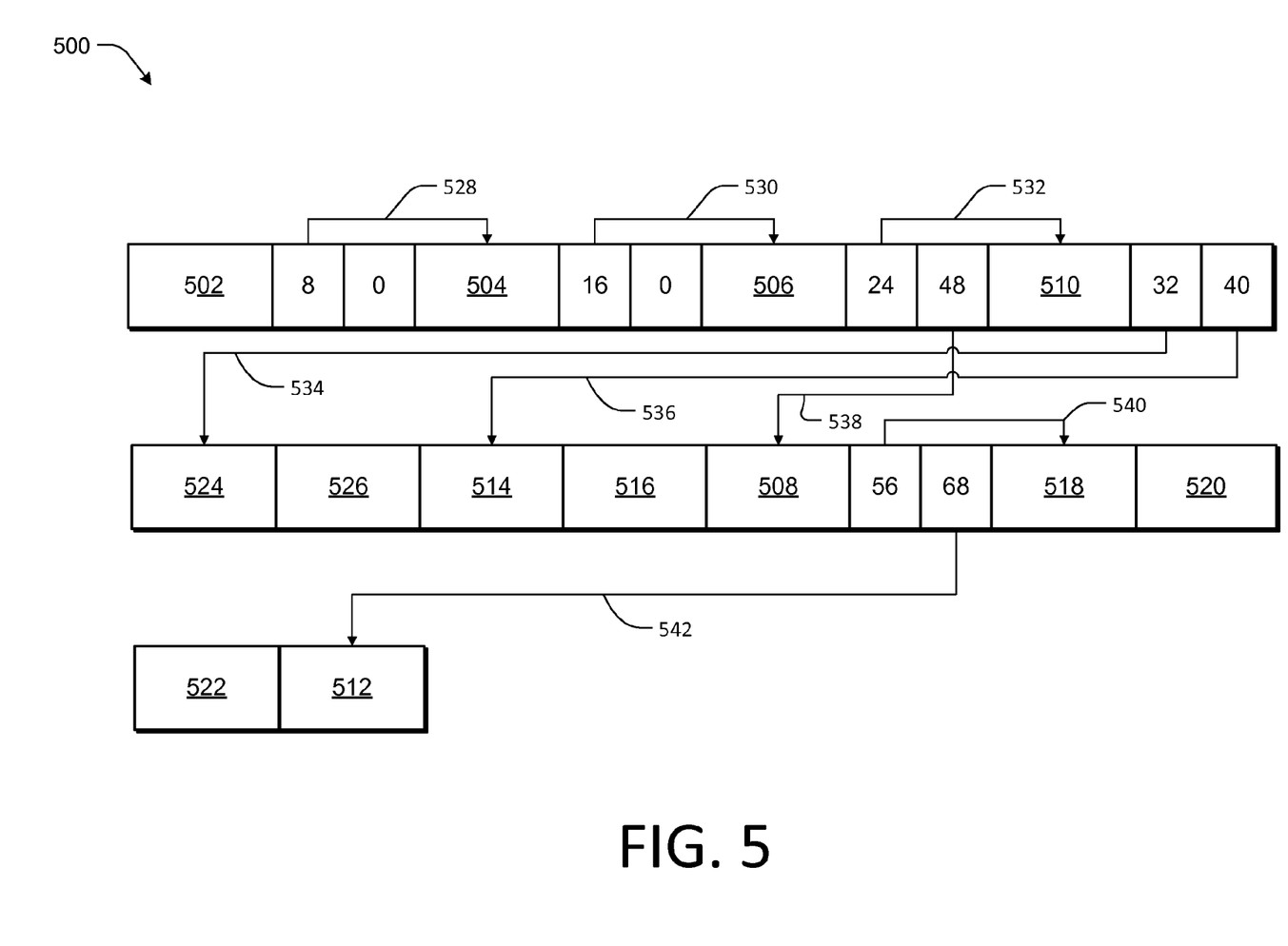
FIG. 5 is a block diagram of an example data tree for routing a packet in a network system according to some implementations.

FIG. 5 is a block diagram of an example data tree 500 for routing a packet in a network system according to some implementations. Data tree 500 is representative of and will be described with respect to network system 400 of FIG. 4.

Data tree 500 is a left child right sibling (LCRS) representation, such that every data block has no more than three fields no matter how many children the node has. The three fields include a four byte address field of the current node, a two byte pointer to the leftmost child, and a two byte pointer to the leftmost sibling. It should be noted that, the left child pointer of a leaf node is null and the children of an intermediate node are encoded as a continuous data block at the rightmost side, so the left sibling pointer is unnecessary for a leaf node. As a result, each data block representing a leaf node has one field, i.e., the address field. Because of this, each data block representing an intermediate node is eight bytes and each data block representing a leaf node is four bytes. Both types of data blocks are divisible by two, which means that the two lowest bits of a pointer are zero. Therefore, during the encoding process the first and second bits can be overridden by packet source 402. The first bit of a pointer is overridden to denote if the child or sibling pointed to by the pointer is a leaf or intermediate node. The second bit is overridden to denote if an intermediate node should receive a copy of the data packet for processing. For example, if an intermediate device was also a packet destination.

Data tree 500 includes data blocks 502, 504, 506, 508, and 510 representative of the intermediate nodes and data blocks 512, 514, 516, 518, 520, 522, 524, and 526 representative of the leaf nodes. Each data block 502-526 corresponds to a system included in network 400 of FIG. 4. For example, data block 502 corresponds to packet source 402, each of data blocks 502-510 correspond to one of intermediate devices 404-410, and each of data blocks 512-526 correspond to one of packet destinations 412-426.

In the illustrated example, data block 502 includes the address of packet source 402, pointer 528 to data block 504, which corresponds to intermediate device 404, and an empty pointer as packet source 402 has no siblings. Data block 504 includes the address of intermediate device 404, pointer 530 to data block 506, which corresponds to intermediate device 406 (the leftmost child of intermediate device 404), and an empty pointer as intermediate device 404 has no siblings. Data block 506 includes the address of intermediate device 406, pointer 532 to data block 512, which corresponds to intermediate device 406 (the leftmost child of intermediate device 406), and pointer 538 to data block 508 (the leftmost sibling of intermediate device 406). Data block 508 includes the address of intermediate device 408, pointer 540 to data block 518, which corresponds to packet destination 418 (the leftmost child of intermediate device 408), and pointer 542 to data block 512, which corresponds to packet destination 412 (the leftmost sibling of intermediate device 408). Data block 510 includes the address of intermediate device 410, pointer 534 to data block 524, which corresponds to packet destination 424 (the leftmost child of intermediate device 410), and pointer 536 to data block 514, which corresponds to packet destination 414 (the leftmost sibling of intermediate device 410).

When packet source 402 prepares to send a data packet, packet source 402 encodes data tree 500. Packet source 402 first encodes the root, then the leftmost child then the siblings of the leftmost children. For example, packet source 402 encodes its address, then pointer 528 to data block 504. Packet source 402 continues to encode data tree 500 in this manner. By encoding data tree 500 recursively the nodes of any sub-tree formed from data tree 500 are encoded together as a continuous block.

Once data tree is encoded by packet source 402, packet source 402 provides data tree 500 to intermediate device 404. Intermediate device 404 performs the first of several splits to data tree 500 and form two sub-trees. First, intermediate device 404 checks its left most child pointer 530, which points to data block 506 corresponding to intermediate device 406. As discussed above the last bit in each of the pointers are overridden by packet source 402 during the encoding process to denote if the node pointed to is an intermediate node or a leaf node. Thus, by checking pointer 530, intermediate device 404 determines that intermediate device 406 is an intermediate node. Next intermediate device 404 checks the leftmost sibling pointer 538 of data block 506 to determine that data block 508 corresponding to intermediate device 408, which is also an intermediate node. Intermediate device 404 next checks leftmost sibling pointer 542 of data block 508 to determine that data block 512 corresponding to packet destination 412 and is a leaf node.

After checking the pointers and identifying the children, intermediate device 404 is able to determine that, intermediate device 404 should generate two sub-trees. The first sub-tree to be provided to intermediate device 406 and the second sub-tree to be provided to intermediate device 408. Intermediate device 404 provides the data packet to packet destination 412 as packet destination 412 is a leaf node and, therefore, intermediate device 404 does not need to generate a third sub-tree.

The first sub-tree includes a continuous data block from data block 506 to data block 516. The second sub-tree includes a continuous data block from data block 508 to 522. As illustrated, packet source 402 encoded data tree 500 in a LCRS manner first encoding the root then the leftmost child and the sibling of the leftmost child. Thus, data tree 500 is formed in such a way that intermediate nodes split data tree 500 into sub-trees that are continuous blocks reducing overall processing at each of the intermediate nodes.

Intermediate device 404 provides the first sub-tree to intermediate device 406 and the second sub-tree to intermediate device 408. Following the path of the first sub-tree, intermediate device 406 checks leftmost child pointer 532 to determine that data block 510, corresponding to intermediate device 410, is an intermediate node. Next intermediate device 406 check the left most child pointer 536 of data block 510 to determine that packet destination 414 is a leaf node. Because packet destination 414 is a leaf node and intermediate device 406 knows that all siblings are encoded together, intermediate device 406 checks its leftmost sibling pointer 538 to determine the address at which the sibling data ends, in this example, data block 508. After determining the location of data block 508, intermediate device 406 is able to read data block 516 corresponding to the remaining child, packet destination 416.

After reading the first sub-tree, intermediate device 406 determines that intermediate device 406 has three children, one intermediate node and two leaf nodes. Intermediate device 406 forms a third sub-tree formed form a continuous data block starting at data block 510 and ending at data block 426. Intermediate device 406 provides the third sub-tree to intermediate device 410 and the data packet to packet destination 414 and 416.

Intermediate device 410 receives the third sub-tree from intermediate device 406. Intermediate device 410 checks leftmost child pointer 534 and determines that packet destination 424, corresponding to data block 524, is a leaf node. Next, intermediate device 410 reads the remaining data blocks representing the other leaf nodes. In this instance, data block 526 corresponds to packet destination 426. After reading the addresses, intermediate device 410 provides the data packet to both packet destination 424 and 426.

Returning to intermediate device 408, intermediate device 408 receives the second sub-tree form intermediate device 404. Similar to intermediate device 410, intermediate device 408 checks leftmost child pointer 540 and determines that pointer 540 points to a leaf node (data block 518 corresponding to packet destinations 418). Next, intermediate device 408 determines that, intermediate device 408 has two other children, packet destination 420 and 422, by reading data blocks 520 and 522, respectively. After reading the address, intermediate device 408 provides the data packet to packet destination s 418, 420, and 422.

In one implementation, each of intermediate devices 404-410 also check the second bit of the left child pointers 528, 530, 532, 534, 540 to determine if any of intermediate devices 404-410 should also receive a copy of the data packet for processing.

Figure 6:
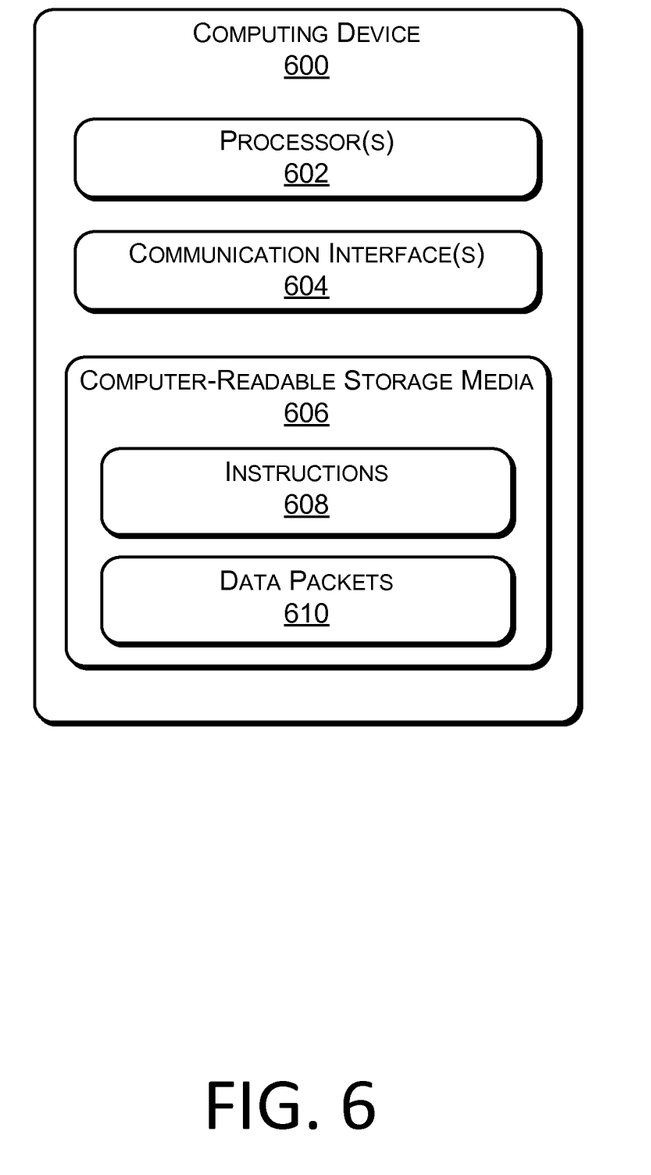
FIG. 6 is a block diagram of an example computing device according to some implementations.

FIG. 6 is a block diagram of an example computing device 600 according to some implementations. Computer system 600 includes one or more processor(s) 602, one or more communication interface(s) 604, and one or more computer-readable storage media 608. Communication interfaces 604 are configured to communicate data to and from a network, such as network systems 100, 200, 300, and 400.

Any number of program modules, applications, or components can be stored in the computer-readable storage media 606, including by way of example, instructions 608 and data packets 610. The instructions 608 stored in computer-readable storage media 606 and executable by processors 602 to cause computing device 600 to processes or otherwise encode data packets 610.

In one implementation, computing device 600 is in communication with a network device, such as intermediate device 102 of FIGS. 1-3, via at least one of communication interfaces 604. Instructions 608 may be configured to cause processors 602 to monitor the queue length of one or more buffers within the network device when executed. If processors 602 detects that one or more of the queue length of the network device exceeds a maximum threshold, processors 602 request the network device to forward incoming data packets to computing device 600. Computing device 600 then stores the incoming data packets as data packets 610 in computer-readable media 606 until processors 602 detect that the queue length within the network device has dropped below a minimum threshold. Once the queue length in intermediate device 102 is below the minimum queue length threshold, processors 602 begins to forward data packets 610 back to the network device for routing to packet destinations.

In this implementation, instructions 608 further cause processors 602 to schedule, order, and/or otherwise process data packets 610 while stored on computing device 600. For example, processors 602 may reject duplicate packets and/or to otherwise reorder the packets to ensure similar processing times for all processes.

In another implementation, instructions 608 causes computing device 600 to generate a data tree, such as data tree 500. For instance, computing device 600 may be an example of packet source 402 of FIG. 4, and instructions 608 may be configured to cause processors 602 to encode the data packet with a data deliver tree. If so, processors 602 first encode the address of each node, then the leftmost child of that node, followed by the siblings of the leftmost children of each node. Instructions 608 further cause processor 602 to encode the data tree recursively, such that any sub-trees formed from the data tree are encoded together as a continuous data blocks as discussed above.

In yet another implementation, instructions 608 causes computing device 600 to parse and split a data tree, such as data tree 500, into one or more sub-trees in response to receiving the data packet. For example, computing device 600 may be a network device, such as intermediate devices 404-410 of FIG. 4, and instructions 608 may cause the processors 602 to parse the data tree in order to identify intermediate and leaf children. Instructions 608 may further cause processor 602 to generate a sub-tree for each intermediate child detected and to provide the sub-trees to the intermediate children and the data packet to the leaf children.

Example methods for performing techniques described herein are discussed in detail below. These example methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote memories.

The example methods are sometimes illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer executable instructions that, when executed by one or more processors, perform the recited operations.

Figure 7:
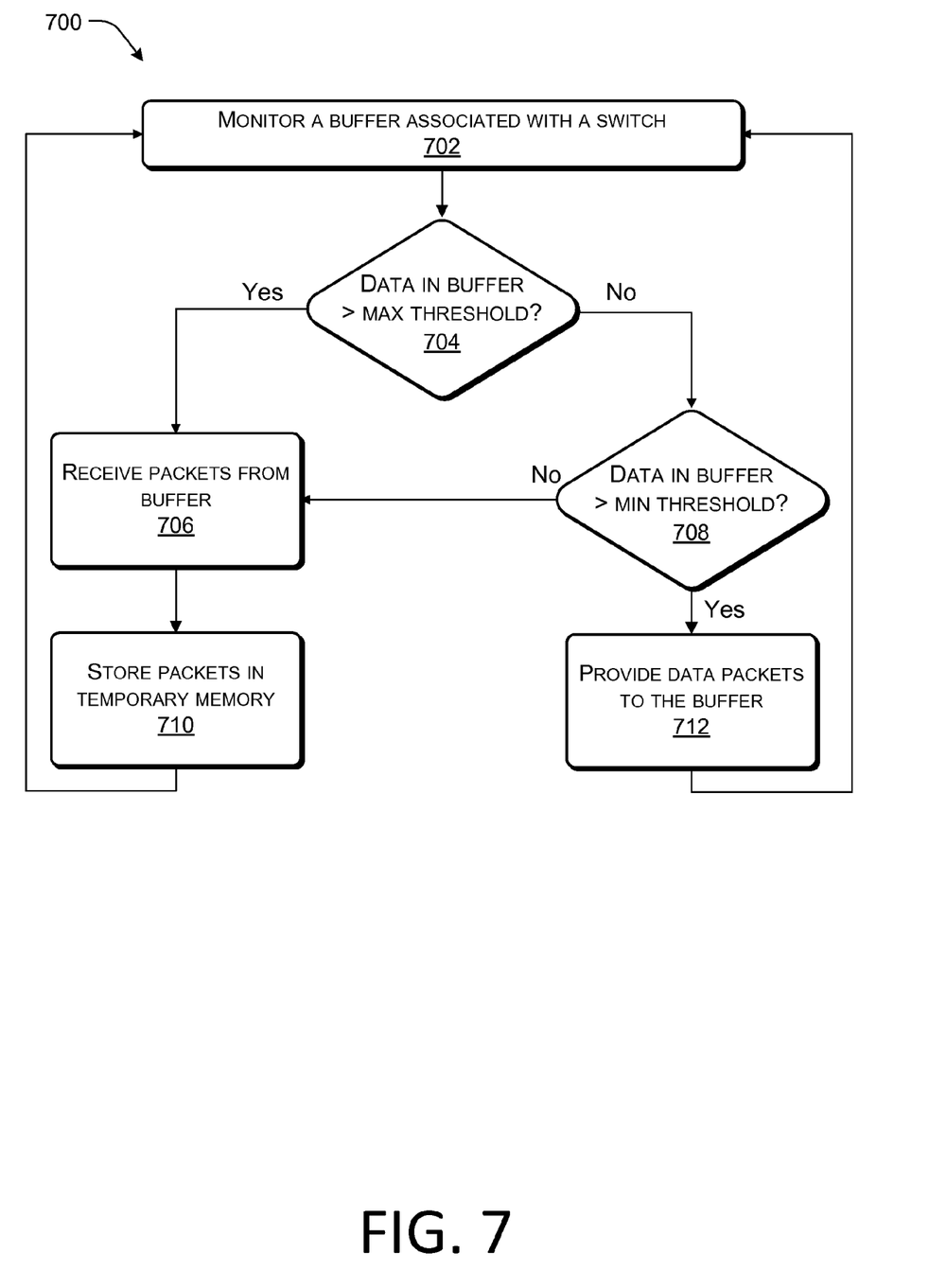
FIG. 7 is a flow diagram of an example process for queuing data packets according to some implementations.

FIG. 7 is a flow diagram of an example process for queuing data packets according to some implementations. At 702, a computing device, such as computing device 104 of FIGS. 1-3, monitors a buffer associated with a network device, such as intermediate device 102 of FIGS. 1-3. For example, the computing device may monitor the buffer by receiving periodic updates from the intermediate device as to the queue length.

At 704, the computing device determines if the data in the buffer exceeds a maximum threshold level, and if so the computing device requests that the incoming data packets be forwarded to the computing device for temporary storage and process 700 proceeds to 706. If, however, the buffer does not exceed the maximum threshold level process 700 proceeds to 708.

At 706, the computing device receives data packets from the network device. As the data packets are received, the computing device may reject duplicate packets or long flows to improve processing speed and prevent backups in the computing device.

At 710, the computing device stores the data packets in a computer-readable media, such as a DRAM. While storing the data packets, the computing device may schedule and/or otherwise reorder the packets to ensure similar processing times for all flows.

Returning to 708, the computing device determines if the queue length of the buffer drops below a minimum threshold and if so process 700 proceeds to 712. Otherwise, if the queue remains above the minimum threshold process 700 returns to 706 and continues to receive incoming data packets. It should be noted that the minimum and maximum thresholds may vary depending on size of the buffer, the processing speed of the network device, the rate of incoming data packets, the size of the computer readable storage media in computing device, and/or the number of computing devices associated with the network device. In one particular example, the minimum and maximum thresholds may be the same.

At 712, the computing device begins to provide the data packets to the buffer. The computing device may provide them in orders other than that received, for example, to improve overall data flow and ensure that no data flows are starved out.

Figure 8:
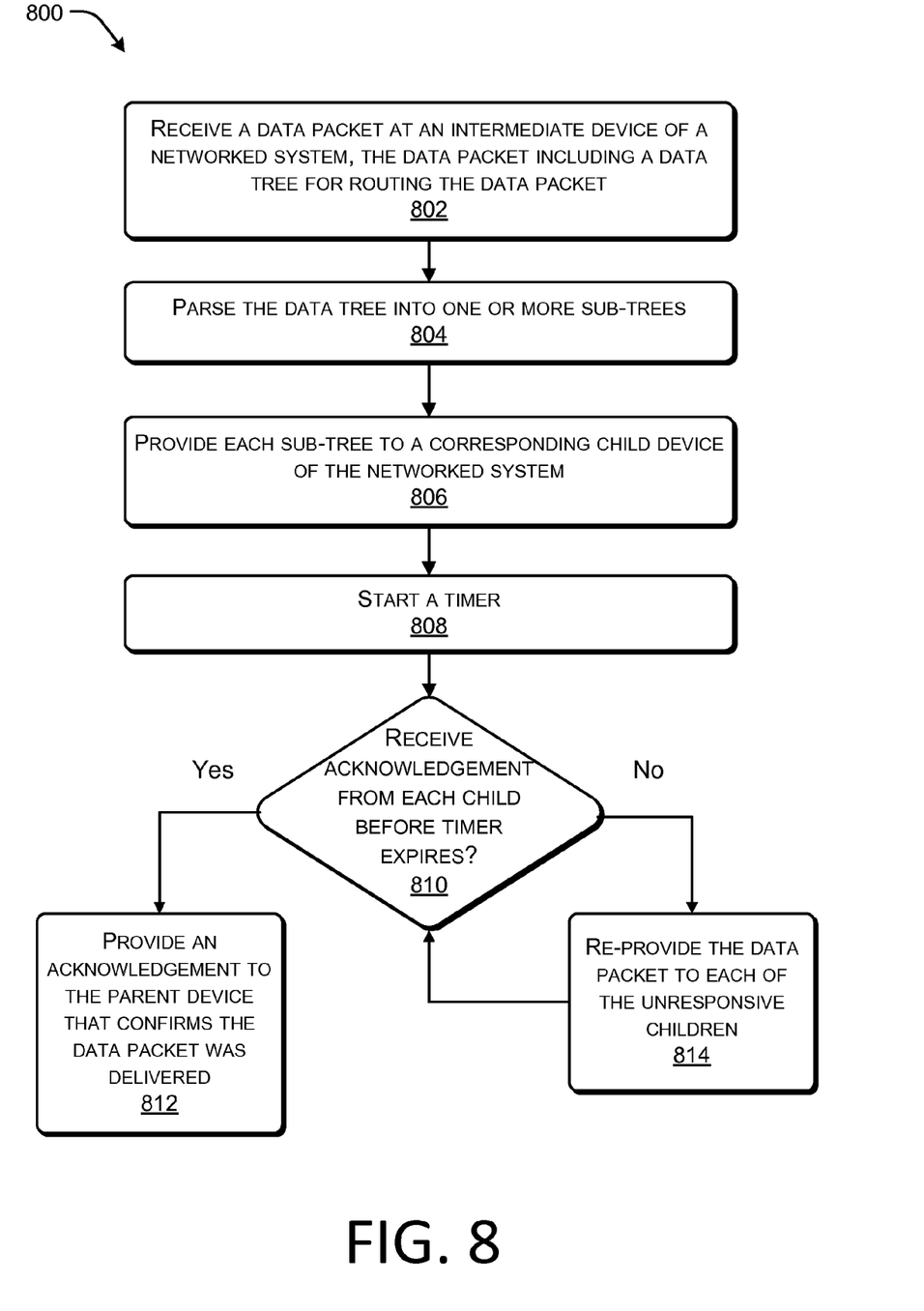
FIG. 8 is a flow diagram of an example process for routing data packets according to some implementations.

FIG. 8 is a flow diagram of an example process 800 for routing data packets according to some implementations. At 802, an intermediate device receives a data packet, the packet including a data tree for routing the data packet. The data tree is a LCRS tree in which each data block corresponding to an intermediate node of the tree includes three fields, an address field, a pointer to the leftmost child, and a pointer to the leftmost sibling of the current node. In the data tree, each data block corresponding to a leaf node includes the address of the child.

At 804, the intermediate device parses the data tree into one or more sub-trees. The intermediate device first identifies the number and type (intermediate or leaf) of each child node. The intermediate device does so by parsing the particular encoding of the data tree and following the child and sibling pointers as described above with respect to FIG. 5. For each child that is an intermediate node a sub-tree is formed.

At 806, the intermediate device provides each of the sub-trees generated to the corresponding child device of the networked system. Each of the sub-trees is formed from a continuous data block of the data tree and represents a data tree with the intermediate device as the root.

At 808, the intermediate device starts a timer. The timer is used to determine if the data packet provided to a child is lost or dropped. In one example, the length of the timer may vary depending on the location of the intermediate device in the network system.

At 810, the intermediate device receives acknowledgement from each child node. If the acknowledgements are received from all children before the timer expires, process 800 proceeds to 812. If, however, not all children respond with an acknowledgement, process 800 proceeds to 814.

At 812, the intermediate device provides an acknowledgement to the parent device confirming that the data packet was delivered. In some examples, the acknowledgment to the patent node is provided before all children have responded. In this example, the acknowledgment includes an ID of the current node and a list of the non-responsive children. The acknowledgment does not need to include the list of all responding children because the structure of data delivery tree is known to the parent and, thus, if the intermediate device had many children the data size of the acknowledgment remains small, as the number of non-responsive children is typically much smaller than the number of acknowledging children.

At 814, the timer has expired without at least one of the children responding with an acknowledgment of receipt of the data packet. Thus, the intermediate device re-provides the data packet to each the unresponsive children and restarts the timer. In one example, this loop continues until the unresponsive child acknowledges receipt of the data packet.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method comprising:
   receiving a data tree and corresponding data packet at an intermediate node of a networked system;
   parsing the data tree to identify one or more child nodes of the intermediate node;
   generating a sub-tree from a continuous block of the data tree for each of the identified child nodes; and
   providing each sub-tree to the corresponding child node, wherein each of the sub-trees corresponds to a different subset of the continuous block of the data tree.

2. The method as recited in claim 1, further comprising starting a timer in response to providing each sub-tree to the corresponding child node.

3. The method as recited in claim 2, further comprising re-providing each sub-tree to the corresponding child node when the timer expires if no acknowledgement was received from the child node.

4. The method as recited in claim 2, further comprising:
   aggregating acknowledgements received from the child nodes; and
   providing the aggregated acknowledgements to the parent node.

5. The method as recited in claim 4, wherein the aggregated acknowledgement includes an ID of the current node and a list of nodes that did not provide an acknowledgement.

6. The method as recited in claim 4, wherein the providing the aggregated acknowledgement is in response to the expiration of the timer or receipt of an acknowledgement from each of the child nodes.

7. The method as recited in claim 1, wherein the data tree is a left child right sibling tree.

8. The method as recited in claim 1, wherein each intermediate node of the data tree includes three fields, a first field including an address of the current node, a second field including a pointer to a leftmost child node, and a third field including a pointer to a leftmost sibling of the node.

9. The method as recited in claim 8, wherein each of the pointers are two bytes, a first bit of each of the pointers indicating that the pointer points to a left node and a second bit indicating if the intermediate node needs to receive the data packet.

10. One or more computer storage media storing instructions that, when executed by one or more processors, cause the one or more processors to:
    encode a plurality of nodes into a left child right sibling (LCRS) data delivery tree starting at a root node, the plurality of nodes including the root node, at least one intermediate node, and at least one leaf node, each of the at least one intermediate nodes including three fields, a first field including an address of the at least one intermediate node, the second field including a pointer to a leftmost child of the at least one intermediate node, and the third field including a pointer to a leftmost sibling of the at least one intermediate node, each of the at least one leaf nodes including one field indicating the address of the at least one leaf node, the encoding comprising recursively encoding a node of the plurality of nodes followed by the leftmost child of the node, followed by siblings of the leftmost child until each of the plurality of nodes are encoded.

11. The one or more computer storage media as recited in claim 10, wherein one bit of each pointer is overridden to indicate that the pointer points to a left node.

12. The one or more computer storage media as recited in claim 10, wherein one bit of each pointer is overridden to indicate if an intermediate node needs to receive a data packet.

13. A device comprising:
    one or more processors; and
    one or more computer-readable storage media for storing data packets and instructions that, when executed, cause the one or more processors to:
    receive a data tree and corresponding data packet at an intermediate node of a networked system;
    parse the data tree to identify one or more child nodes of the intermediate node;
    generate a sub-tree from a continuous block of the data tree for each of the identified child nodes; and
    provide each sub-tree to the corresponding child node, wherein each of the sub-trees corresponds to a different subset of the data tree.

14. The device as recited in claim 13, wherein the instructions, when executed, cause the one or more processors to start a timer in response to providing each sub-tree to the corresponding child node.

15. The device as recited in claim 14, wherein the instructions, when executed, cause the one or more processors to re-provide each sub-tree to the corresponding child node when the timer expires if no acknowledgement was received from the child node.

16. The device as recited in claim 13, wherein the instructions, when executed, cause the one or more processors to:
    aggregate acknowledgements received from the child nodes; and
    provide the aggregated acknowledgements to the parent node.

17. The device as recited in claim 16, wherein the aggregated acknowledgement includes an ID of the current node and a list of nodes that did not provide an acknowledgement.

18. The device as recited in claim 16, wherein the aggregated acknowledgement is provided in response to the expiration of the timer or receipt of an acknowledgement from each of the child nodes.

19. The device as recited in claim 13, wherein the data tree is a left child right sibling tree.

20. The device as recited in claim 13, wherein each intermediate node of the data tree includes three fields, a first field including an address of the current node, a second field including a pointer to a leftmost child node, and a third field including a pointer to a leftmost sibling of the node.

* * * * *